United States Patent [19]
Allman et al.

[11] Patent Number: 5,861,055
[45] Date of Patent: *Jan. 19, 1999

[54] POLISHING COMPOSITION FOR CMP OPERATIONS

[75] Inventors: Derryl D. J. Allman, Colorado Springs, Colo.; William J. Crosby, Perrysburg; James A. Maiolo, Waterville, both of Ohio

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[*] Notice: The term of this patent shall not extend beyond the expiration date of Pat. No. 5,645,736.

[21] Appl. No.: 822,078

[22] Filed: Mar. 20, 1997

Related U.S. Application Data

[63] Continuation of Ser. No. 581,152, Dec. 29, 1995, abandoned.

[51] Int. Cl.⁶ ............................... C09G 1/02; B24B 1/00
[52] U.S. Cl. ........................... 106/3; 106/11; 106/287.14; 106/287.13; 216/89; 438/692; 438/693; 51/298; 51/300; 51/303; 51/308
[58] Field of Search ........................... 106/3, 11, 287.14, 106/287.13; 216/89; 438/692, 693; 51/298, 300, 303, 308

[56] References Cited

U.S. PATENT DOCUMENTS

| | | | |
|---|---|---|---|
| 2,523,281 | 9/1950 | Currie | 106/3 |
| 4,260,396 | 4/1981 | Glemza | 106/3 |
| 4,462,188 | 7/1984 | Payne | 51/283 R |
| 4,544,377 | 10/1985 | Schwen | 51/298 |
| 4,665,116 | 5/1987 | Kornhaber et al. | 524/268 |
| 5,043,012 | 8/1991 | Shinohara et al. | 106/10 |
| 5,264,010 | 11/1993 | Brancaleoni et al. | 51/308 |
| 5,352,277 | 10/1994 | Sasaki | 106/3 |
| 5,389,352 | 2/1995 | Wang | 106/3 |
| 5,470,798 | 11/1995 | Ouellet | 437/231 |
| 5,645,736 | 7/1997 | Allman | 216/89 |

FOREIGN PATENT DOCUMENTS

| | | | |
|---|---|---|---|
| 2228098 | 12/1973 | France . | |
| 2900233 | 7/1979 | Germany | 106/3 |
| 279893 | 6/1990 | Germany | 106/3 |

*Primary Examiner*—Melissa Bonner
*Attorney, Agent, or Firm*—Charles D. Gunter, Jr.; Wayne P. Bailey

[57] ABSTRACT

A polishing composition is shown which includes (1) a polishing media particle; (2) a film forming binder for suspending the particle and forming a temporary film on an exposed surface of the workpiece, the temporary film being dissolvable in a subsequently applied polishing wash, whereby the polishing media particle is freed to polish the workpiece; (3) a solvent for suspending the polishing media particle in the film forming binder to facilitate forming the temporary film; and (4) a wetting agent to improve the wettability of the composition on the exposed surface of the workpiece.

9 Claims, No Drawings

POLISHING COMPOSITION FOR CMP OPERATIONS

This is a continuation of application Ser. No. 08/581,152, filed Dec. 29, 1995, now abandoned.

BACKGROUND OF THE INVENTION

1. Technical Field

The present invention relates generally to compositions used for polishing and planarizing the surfaces of various workpieces, such as the surfaces of semiconductors.

2. Description of the Related Art

Compositions useful for polishing the surfaces of various workpieces are well known in the art. Conventional polishing compositions, which are used for polishing the surfaces of semiconductors, glass, crystal, metal and ceramic workpieces, generally comprise aqueous slurries of an appropriate abrasive agent or particle or mixtures of such particles. Commonly utilized abrasive agents include cerium oxide, aluminum oxide, zirconium oxide, tin oxide, silicon dioxide, titanium oxide, etc. Polishing compositions utilizing such agents are generally used by first applying the composition to a polishing pad or to the surface to be polished. The polishing pad is then applied to the surface, which causes the abrasive particles contained within the composition to mechanically abrade the surface, thus effecting the polishing action. However, such conventional polishing compositions used in the general polishing arts cannot produce the highly specular and planar surfaces required in semiconductor and microelectronic component technology. Moreover, conventional polishing compositions have demonstrated disadvantages, such as poor polishing rates and poor surface quality, in polishing other workpieces. For example, the surfaces of glass, metals and semiconductors polished with such compositions demonstrate various defects such as haze, stains, scratches, undulations, undercuts, mesas, etc.

Attempts have been made in the prior art to improve the existing, commercially useful polishing compositions. Two methods of attaining improvement in these areas include (1) the combination of various abrasives; and (2) adding various adjuvants to the compositions.

Examples of combinations of abrasive particles include combinations of, e.g., cerium oxide and a rare earth pyrosilicate. Examples of the use of adjuvants in polishing compositions include the use of salts such as potassium chloride or ammonium chloride or combinations of such salts to promote the polishing effectiveness of the metal surface by the abrasive agent. However, even the addition of cooperating abrasive agents or the addition of adjuvant materials, has failed to produce completely satisfactory polishing compositions capable of producing the planarized surfaces needed in modern semiconductor and microelectronics technology.

To provide superior results, special chemical mechanical polish (CMP) compositions must be used to polish or planarize the surface of prepared semiconductor workpieces. Such compositions must produce an extremely flat and level surface with a high quality polish, i.e., a planar surface. However, unlike conventional polishing to provide a planar surface, the polishing action must be restricted to the level surface of the workpiece and must not affect the topography, morphology and/or structures below the surface. Only such selective polishing action will produce the desired planar surface. Conventional polishing compositions are not suited for such procedures as they merely produce uneven, undulating surfaces by abrading certain regions on, below and within the surface of the workpiece. It has proven difficult, if not impossible, to use conventional polishing products to obtain smooth defect-free surfaces wherein the polishing composition does not adversely affect the underlying structure of the workpiece.

Even where specially designed CMP compositions are applied as an aqueous slurry to the workpiece, other shortcomings exist such as a high consumption rate of slurry, as well as shortcomings in the delivery of slurry to the center of the semiconductor wafer, via the polishing pad, while polishing the surface of the wafer flat. The polishing pad used also deforms to the surface of the wafer, preventing 100% perfect planarization from being achieved. Another problem with the prior art processes is that the CMP operation upon an oxide has no end point capability and therefore is dependent upon knowing and controlling the removal rate such that the operation can be timed to control the degree of planarization.

Accordingly, it can be seen that a long felt need exists for polishing compositions which provide improved polishing activity at improved rates and which will produce planar and defect-free surfaces, particularly in modern semiconductor and microelectronics applications.

SUMMARY OF THE INVENTION

In the present invention, a polishing composition is provided for polishing a target substrate. The polishing composition comprises a polishing media particle and a film forming binder for suspending the particle and forming a temporary film on the target substrate. The temporary film is dissolvable in a subsequently applied polishing wash, whereby the polishing media particle is freed to polish the target substrate.

A polishing composition is also shown for polishing or planarizing a workpiece, such as the surface of a semiconductor. The composition comprises (1) a polishing media particle; (2) a film forming binder for suspending the particle and forming a temporary film on an exposed surface of the workpiece, the temporary film being dissolvable in a subsequently applied polishing wash, whereby the polishing media particle is freed to polish the workpiece; (3) a solvent for suspending the polishing media particle in the film forming binder to facilitate forming the temporary film; and (4) a wetting agent to improve the wettability of the composition on the exposed surface of the workpiece.

Preferably, the polishing media particle is selected from the group consisting of silica, aluminum trioxide, calcium oxide, silicon nitride, silicon carbide, cesium oxide, natural and synthetic diamonds, tungsten oxide, titanium nitride, titanium oxide, silicon dioxide, other materials harder than silicon dioxide and combinations thereof. The film forming binder is preferably a polyorganosiloxane and the wetting agent is preferably an organofunctional silane. The solvent can be any suitable solvent which will suspend the particle and film forming binder and is preferably selected from the group consisting of water, acids and alcohols and combinations thereof.

The compositions of the invention act only at the level surface of the workpiece to provide a planar, defect-free surface without adversely affecting the underlying morphology and structure of the workpiece.

The above as well as additional objectives, features, and advantages of the present invention will become apparent in the following detailed written description.

DETAILED DESCRIPTION

A CMP composition, as will be familiar to those skilled in the art, acts to mechanically and chemically abrade and dissolve the surface of the workpiece to a predetermined and desired extent. Additionally, the polishing compositions of the invention are curable chemical solutions which are used to form a temporary film on the surface of a substrate to be polished. The first component of the polishing compositions of the invention is a polishing media particle which can be selected from the group consisting of silica, calcium oxide, aluminum oxide, silicon nitride, silicon carbide, cesium oxide, natural and synthetic diamond, metal silicides, tungsten oxide, titanium nitride, titanium oxide, other materials harder than the polishing substrate. These polishing media particles will be familiar to those skilled in the polishing arts and are commercially available from a number of sources. The preferred polishing media particles are silica particles. The particle size of the preferred silica particles is generally less than about 1 micron. The term "particle size" as used herein refers to the average diameter of the particles, or if the particles are not substantially spherical, the average maximum dimension of the particles. Larger particles have been found to produce deep scratches in semiconductor substrates, producing a less than desirable result.

The polishing media particles are present in the compositions of the invention in an amount which defines a solids content for the compositions. The polishing media particle solids content is less than about 80% by weight of the compositions of the invention. The term "percent" or "%" as used herein, unless otherwise stated or unless it is otherwise clear from the context in which it is used, refers to the percentage by weight of the indicated components in relation to the total weight of the polishing composition of the invention.

As has been mentioned, the preferred polishing media particles are silica particles. It should be noted that in the discussion which follows, "silica" preferably means fumed silica. Various other forms of silicon exist, and are to be distinguished from the elemental silicon of the compositions of the invention. Fumed silica is available commercially from several sources and is manufactured by hydrolysis of a volatile silane compound, such as silicon tetrachloride, in an oxygen-hydrogen gas flame. Precipitated silica is also available commercially from several sources. Generally, precipitated silica is made by reacting an alkaline silicate solution, such as sodium silicate with a mineral acid, such as sulfuric acid, generally under alkaline reaction conditions. Silica is the major reaction product formed by precipitation. A detailed description of the various forms of silicon and silica materials is presented in U.S. Pat. No. 5,352,277, to Sasaki, issued Oct. 4, 1994, the disclosure of which is incorporated herein by reference. For purposes of the present invention silica (Si) particles and not $SiO_2$ are utilized as the preferred abrasive component of the compositions.

The polishing compositions of the invention also include a film forming binder for suspending the particles and forming a temporary film on the target substrate, the temporary film being dissolvable or gradually worn away or depleted in a subsequently applied polishing wash, whereby the polishing media particle is freed to polish the target substrate. The film forming binder is part of a solution which contains the polishing media particle which exists with or is attached to a polymer matrix or which is suspended in a solution of alcohol, water or acid.

The polymer which is used to form the film forming binder can have a backbone of carbon, silicon, cesium or a combination of these elements, with or without an oxygen or halogen element in the backbone. The structure of the polymer is not critical. The polymer is merely used as a binding or holding film or holding matrix for the polishing particle on the surface of the substrate. The polymer which is applied as a temporary film to the substrate is dissolved during the polishing action, releasing the polishing particle. The preferred polymer used to form a temporary film on the target substrate is a polyorganosiloxane. However, other candidate polymeric materials include polymers of acrylamide, acrylic acid, methacrylic acid, maleic acid, ethylene oxide, and vinylpyrrolidone, polymers of cellulose, guar polymers, graft copolymers of guar and cellulose, xanthan polymers, organic polymers, etc. It is only necessary that the polymer evenly disperse and hold the polishing media particles in a temporary film or matrix on the target substrate to be polished and that the binder be dissolvable or depletable in the subsequently applied polishing slurry or wash.

The organopolysiloxane polymers employed in the preferred matrices of the invention are well known materials and can be made by standard methods known in the art. The preferred polymer is an organopolysiloxane which contains methyl, vinyl, phenyl and/or 3,3,3-trifluropropyl radicals attached to the silicone atoms of the polymeric siloxane. Examples of organopolysiloxanes are those polymers, copolymers and mixtures thereof wherein the siloxy units can be dimethylsiloxane, phenylmethylsiloxane, 3,3,3-trifluoropropylmethyl siloxane, diphenylsiloxane, methylvinylsiloxane, and phenylvinylsiloxane. A discussion of the preparation of such compounds can be found, for example, in: Eaborn, D., "Organo Silicone Compounds", Academic Press, New York, 1959; Montermoso, J. C., "Silicone Rubbers", Morton, E. D., "Introduction to Rubber Technology", Reinhold Publishing Corp., New York, 1959; Rochow, E. G., "An Introduction to the Chemistry of Silicones", to Ed. John Wiley and Sons, New York, 1951.

The polymer in solution can be used to control the polishing selectivity of one material to another on the substrate being polished. A carbon based backbone polymer can retard the polishing rate of $SiO_2$ relative to metal. The CeO polymer backbone can enhance the polish rate of $SiO_2$ relative to a metal. Optional R groups attached to the polymer backbone can also be used to enhance or retard the polishing action of the material being polished. The R groups can contain $NH_2$, F, Br, Cl, I, OH, NO, CeO or other groups besides $CH_x$ groups.

The percentage of polymer to the polishing particle can be used to control the polishing selectively or polishing rates. The length or size of the polymer in solution controls the thickness of the film on the substrate, its gap filling capability and product lifetime. The polymer is also used to prevent agglomeration of the polishing particles and allows more polishing particles to be held in suspension.

When the polymer is attached to the particle it can act as a binding media increasing the residence time of the particle on the substrate, thus improving the polishing efficiency. Organic materials that contain amine or vinyl groups that have been attached to the surface of the particle can also cause this effect.

The polishing composition, in addition to a polishing media particle and a film forming binder can include a solvent for suspending the polishing media particle in the film forming binder to facilitate forming the temporary film. Various solvents can be used in the solution including alcohols, acids and water. Acceptable acids include aliphatic carboxylic acids having about 5 to 10 carbon atoms, e.g., adipic acid and citric acid. Acceptable alcohols include simple, monofunctional and polyfunctional alcohols. Example alcohols include methanol and isopropanol, which are both commonly available from a number of commercial sources. The choice of solvent or solvents is determined by the desired coat characteristics of the solution on the surface of an IC wafer. The higher boiling point solvents are desired because they do not evaporate as quickly during the coat operation, allowing the film on the surface of the IC wafer to set up slowly, producing a very even coating across the surface of the wafer.

The polishing compositions can also include a wetting agent to improve the wettability of the composition on the exposed surface of the wafer workpiece. Preferably, the wetting agent is an organofunctional silane. The most preferred wetting agent is a gamma amino propyl triethoxy silane which is commercially available from OSI SPECIALTIES Company as A-1100.

Thus, the most preferred polishing compositions of the invention include (1) a polishing media particle of silica; (2) a polyorganosiloxane binder; (3) an organofunctional silane wetting agent; and (4) an alcohol solvent. The silica particle and polysiloxane are suspended in the alcohol solvent. The ratio of silica to polysiloxane to alcohol is most preferably about 1:1:1 by weight. The ratio of silica to polysiloxane can be varied from about 0.01:1 to 20:1 nominal is 1:1. The ratio of polishing particle and polymer binder to solvent can be varied from about 0.01:1 to 50:1 nominal is 3:1.

In order to form the polishing compositions of the invention, the polishing media particles, polysiloxane polymer binder and alcohol solvent are mixed to form a parent solution. All components of the mix are to be distilled (in the case of liquids) or washed with a solution or acid (in the case of solids) to purify the solution. The solution at this point can be refluxed from 10 minutes to several days in an inert atmosphere or a slight vacuum to promote a reaction between the polymer and silica or to promote continued polymerization of the polymer. After refluxing, the organofunctional silane wetting agent can be added to the solution. The ratio of organofunctional silane to polymer and silica can be from about 0.01:1 to 100:1 nominal for A-1100 is 0.25:1 but is higher for other organofunctional silanes. Addition of the organofunctional silane increases the pH of the solution to above about 14. The organofunctional silane will combine with both the polysiloxane and silica. The reaction can be terminated by adding acetic acid or formic acid to the solution. The reaction can proceed from 10 minutes to several days at room temperature (24° C.). The parent solution should be acidified to pH of 5 to 7 in order to end the reaction. Additional acids or bases may be added to the solution to decrease or increase the final pH. The final solution can be diluted by adding additional alcohol to the parent solution until the desired viscosity or solids content is obtained. The final solids content can range from about 5% to 50% by weight.

The polishing media particle can be treated with the organofunctional silane in solution prior to adding the polymer binder. This reaction can be terminated prior to adding the polymer binder so that a selective reaction can occur. Likewise, the organofunctional silane can be reacted with the polymer binder prior to the addition of the polishing media particle. In some cases, the organofunctional silane can be omitted altogether, depending upon the particular nature of the surface of the workpiece to be polished.

The polishing media particles can also be prereacted with acids or solvents to change the functional groups attached to its outer surface. Washing the silica particles with NH$_4$OH also promotes an exchange of OH groups with amine groups on the particles' outer surface.

The particles can also be grown in an acid or basic hydrolysis reaction prior to adding them to solution, as follows:

Passivation of silica particle:

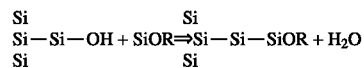

Colloidal silica particle, hydrolysis reaction:

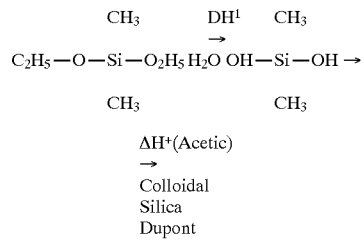

The polishing media particles can also be pretreated with other metal-organic solutions to increase the size of the particles or change the hardness characteristics of the particles. Additional energy may have to be added to the solution in order for the reaction to take place (heating, stirring, agitation).

Although they have unlimited use in polishing various workpieces, the compositions of the invention can be advantageously used in polishing or planarizing the surfaces of interconnected, integrated circuits in semiconductor preparation. The present compositions are used to polish the dielectric layer down to a predetermined, planar level which may be composed of components of varying size, shape and hardness, as well as trenches, holes and valleys.

An invention has been provided with several advantages. The polishing compositions of the invention can be advantageously used in CMP polishing operations to provide an improved degree of global planarity. Since the polishing media particles are retained in a polymer matrix which is applied as a film to the target substrate, there is a reduced consumption of slurry. Further agglomeration of the slurry is prevented by suspending it within a polymer holding matrix. The use of the compositions of the invention results in improved safety and extended lifetime of consumable components. The silica particle can be combined with other sol-gel particles pretreated with other metallic organic solutions or grown in acid or basic hydrolysis reaction to change the properties of the process with regard to selectivity, and type of planarization achieved. The method of the invention can be used for all types of CMP process including oxide, metal and organic.

While the invention has been particularly shown and described with reference to a preferred embodiment, it will be understood by those skilled in the art that various changes in form and detail may be made therein without departing from the spirit and scope of the invention.

What is claimed is:

1. A dissolvable film semiconductor polishing composition for polishing or planarizing a semiconductor workpiece, the composition comprising:

polishing media particles having a particle size less than about one micron, present in an amount to define a solids content for the composition;

a film forming binder comprising a natural or synthetic polymer for suspending the particles and forming a temporary film on an exposed surface of the semiconductor workpiece, the temporary film being gradually removed in a subsequently applied polishing wash, whereby the polishing media particles are freed to polish the workpiece;

a solvent for suspending the polishing media particles in the film forming binder to facilitate forming the temporary film, the solvent being selected from the group consisting of alcohols, acids and water, the solvent being further characterized as having a boiling point selected to allow the film to set up slowly on the exposed surface of the semiconductor workpiece to produce an even coating across the exposed surface;

a wetting agent to improve the wettability of the composition on the exposed surface of the workpiece;

wherein the polishing media particle solids content is greater than 5% and less than about 80% by weight based on the total weight of the composition;

wherein the polishing media particles are selected from the group consisting of silica, calcium oxide, aluminum oxide, silicon nitride, silicon carbide, cesium oxide, natural and synthetic diamond, metal silicides, tungsten oxide, titanium nitride, titanium oxide, other materials harder than the surface of the workpiece to be polished and combinations thereof; and wherein the semiconductor polishing composition forms a temporary dissolvable film on the exposed surface of the workpiece film forming binder is a natural or synthetic polymer selected from the group consisting of polymers of acrylamide, polymers of acrylic acid, polymers of methacrylic acid, polymers of maleic acid, polymers of ethylene oxide, polymers of vinylpyrrolidone, polymers of cellulose, guar polymers, graft copolymers of guar and cellulose and xanthan polymers.

2. The semiconductor polishing composition of claim 1, wherein the polishing media particles are silica particles less than about one micron in size.

3. A semiconductor polishing composition for polishing or planarizing a semiconductor workpiece, the composition comprising:

polishing media particles having a particle size less than about one micron, present in an amount to define a solids content for the composition;

a film forming binder comprising a natural or synthetic polymer for suspending the particles and forming a temporary film on an exposed surface of the semiconductor workpiece, the temporary film being gradually removed in a subsequently applied polishing wash, whereby the polishing media particles are freed to polish the workpiece;

a solvent for suspending the polishing media particles in the film forming binder to facilitate forming the temporary film the solvent being selected from the group consisting of alcohols, acids and water;

a wetting agent to improve the wettability of the composition on the exposed surface of the workpiece;

wherein the polishing media particle solids content is less than about 80% by weight based on the total weight of the composition;

wherein the polishing media particles are selected from the group consisting of silica, calcium oxide, aluminum oxide, silicon nitride, silicon carbide, cesium oxide, natural and synthetic diamond, metal silicides, tungsten oxide, titanium nitride, titanium oxide, other materials harder than the surface of the workpiece to be polished and combinations thereof; and wherein the film forming binder is a polyorganosiloxane.

4. The polishing composition of claim 3, wherein the solvent is an alcohol.

5. A polishing composition for polishing or planarizing a semiconductor workpiece, the composition comprising:

polishing media particles having a particle size less than about one micron, present in an amount to define a solids content for the composition;

a film forming binder for suspending the particles and forming a temporary film on an exposed surface of the semiconductor workpiece, the temporary film being gradually removed in a subsequently applied polishing wash, whereby the polishing media particles are freed to polish the workpiece;

a solvent for suspending the polishing media particles in the film forming binder to facilitate forming the temporary film;

a wetting agent to improve the wettability of the composition on the exposed surface of the workpiece;

wherein the polishing media particle solids content is less than about 80% by weight based on the total weight of the composition;

wherein the polishing media particles are selected from the group consisting of silica, calcium oxide, aluminum oxide, silicon nitride, silicon carbide, cesium oxide, natural and synthetic diamond, metal silicides, tungsten oxide, titanium nitride, titanium oxide, other materials harder than the surface of the workpiece to be polished and combinations thereof;

wherein the film forming binder is a polyorganosiloxane;

wherein the solvent is an alcohol; and wherein the wetting agent is an organofunctional silane.

6. The polishing composition of claim 5, wherein the ratio of polishing media particle to polyorganosiloxane is in the range from about 0.01:1 to 20:1.

7. The polishing composition of claim 6, wherein the ratio of polishing media particle to polyorganosiloxane is about 1:1.

8. A dried film composition for polishing or planarizing a semiconductor workpiece, the dried film composition being made by the process of:

combining the following ingredients:

(a) polishing media particles having a particle size less than about one micron, present in an amount to define a solids content for the composition;

(b) a film forming binder comprising a natural or synthetic polymer for suspending the particles and forming a temporary film on an exposed surface of the semiconductor workpiece, the temporary film being gradually removed in a subsequently applied polishing wash, whereby the polishing media particles are freed to polish the workpiece;

(c) a solvent for suspending the polishing media particles in the film forming binder to facilitate forming the temporary film, the solvent being selected from the group consisting of alcohols, acids and water, the solvent being further characterized as having a boiling point selected to allow the film to set up slowly on the exposed surface of the semiconductor workpiece to produce an even coating across the exposed surface;

(d) a wetting agent to improve the wettability of the composition on the exposed surface of the workpiece;

wherein the solvent is evaporated away to form the dried film;

wherein the polishing media particle solids content is less than about 80% by weight based on the total weight of the dried film composition;

wherein the polishing media particles are selected from the group consisting of silica, calcium oxide, aluminum oxide, silicon nitride, silicon carbide, cesium oxide, natural and synthetic diamond, metal silicides, tungsten oxide, titanium nitride, titanium oxide, other materials harder than the surface of the workpiece to be polished and combinations thereof; and wherein the film forming binder is a natural or synthetic polymer which is selected to evenly disperse and hold the polishing media particle in a dried film on the exposed surface of the semiconductor workpiece.

9. The dissolvable film semiconductor polishing composition of claim 8, wherein the wetting agent is an organo-functional silane.

\* \* \* \* \*